March 26, 1929.  S. N. HURT  1,706,977
WEIGHING SCALE
Filed March 21, 1927
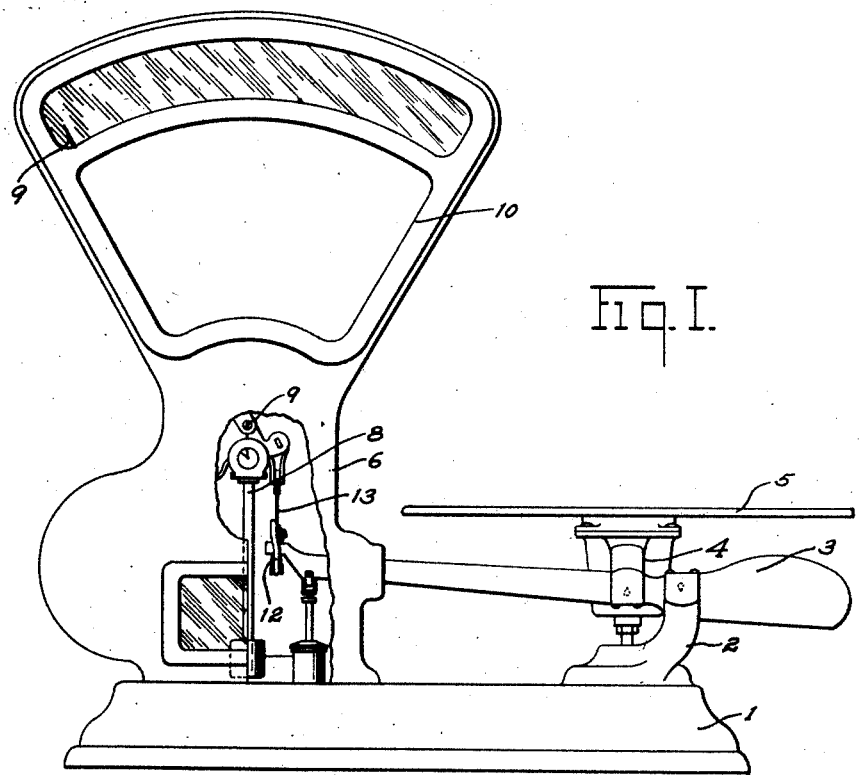
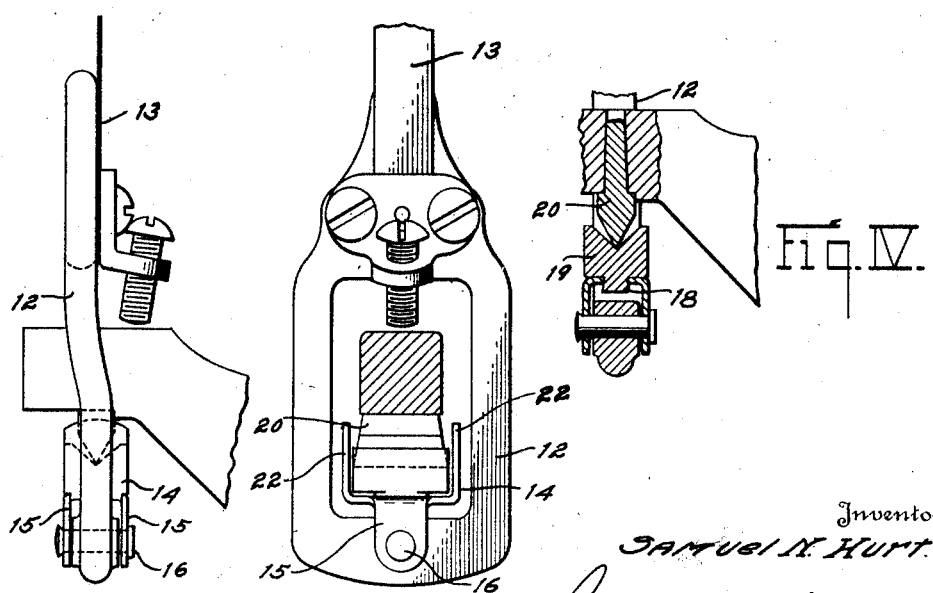
Inventor
SAMUEL N. HURT.
By C.O. Marshall
Attorney Patented Mar. 26, 1929.

1,706,977

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed March 21, 1927. Serial No. 176,873.

This invention relates to weighing scales, and more particularly to pivotal connections between certain elements of the weighing mechanism.

Certain types of weighing scales, and especially those having an automatic pendulum load-counterbalancing mechanism, have moving elements pivotally connected together and which do not move through equal arcs, resulting in a relative movement of the pivotal connection. One of the principal objects of this invention is the provision of a flexible connection for pivotally connecting scale parts together in a manner permitting relative movement of the parts without setting up friction between them.

Another object is the provision of a connection for weighing mechanism which will automatically compensate for slight inaccuracies in the scale parts that are joined by the connection.

Still another object of the invention is the provision of a simple and efficient flexible connection for use in weighing mechanism which may be easily and inexpensively manufactured and assembled by inexperienced workmen.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale of the fan type incorporating my invention, parts being broken away;

Figure II is a greatly enlarged fragmentary detail view of the connection of my invention;

Figure III is an end view of the parts shown in Figure II;

Figure IV is a fragmentary detail sectional view of the connection of my invention.

Referring to the drawings in detail, I have shown my invention as incorporated in a scale of the counter fan type, but it is to be understood that I contemplate the use of my invention in any mechanism wherever it may be found applicable.

The scale consists of a base 1 provided at one end with a base horn or fulcrum stand 2 upon which is pivotally mounted a lever 3, the lever being provided with load pivots suitably supporting a spider 4 surmounted by the commodity receiver 5. The nose end of the lever 3 projects into a housing 6 erected upon the other end of the base 1 and is suitably connected to a pendulum mechanism 8 by means of a connection to be hereinafter more fully described. The pendulum 8 is provided with an indicating hand 9 which is adapted to co-operate with a chart (not shown) located in the fan shaped portion 10 of the housing 6.

The flexible connection between the end of the lever 3 and the pendulum 8 comprises a substantially rectangular frame 12 and a flexible metallic ribbon 13, the lower portion of the frame being provided with a transverse bore. A clip 14 is formed with downwardly projecting ears 15 adapted to straddle the lower portion of the frame 12, the ears 15 having openings which register with the bore in the frame and loosely receive a pintle 16 about which the clip is permitted a limited oscillatory movement.

The bight of the clip 14 is provided with an opening which receives a tenon 18 formed upon the lower part of a V-grooved bearing 19, the tenon 18 being slightly swaged over to prevent the dislodgement of the bearing.

The knife edge pivot 20 fixedly secured in the nose end of the lever 3 engages the V groove in the bearing 19. Lateral projections 22 forming integral parts of the clip 14 are turned upwardly and form end thrusts for the pivot 20 and serve to limit the lateral movement of the pivot relative to the bearing piece 19.

It will be apparent from the foregoing description that the connection will completely compensate for the unequal arcs of the pendulum and lever and for slight manufacturing inaccuracies, as the axes of movement of the bearing piece 19 and supporting clip 22 are at right angles to each other and the connecting frame is, therefore, capable of a limited universal movement relative to the lever 3.

The embodiment of my invention herein shown and described is to be regarded as illustrative only, and it is to be understood that the invention is susceptible of variation, modification and change within the spirit and scope of the subjoined claims.

Having described my invention, I claim:

1. In a device of the class described, in combination, weighing mechanism having relatively movable elements, a knife edge member secured to one of said elements, a connection between said elements comprising a frame, a clip pivotally secured to said frame, and a bearing piece pivotally secured to said clip and capable of movement about an axis substantially at right angles to the pivotal axis of said clip, said knife edge member being adapted for engagement with the bearing piece, said clip being formed with means for limiting the relative lateral movement of the knife edge member.

2. In a device of the class described, in combination, weighing mechanism including a lever having a knife edge pivot, a load-counterbalancing element, connections between said lever and load-counterbalancing element comprising a frame, a clip pivotally secured to said frame, and a V-grooved bearing piece secured to said clip and movable about an axis substantially at right angles to the pivotal axis of said clip, said bearing piece adapted for engagement with the lever pivot, said clip being so formed as to limit the movement of said lever pivot relative to the bearing piece.

SAMUEL N. HURT.